March 22, 1966     T. I. DUFFY     3,241,894
SELF-CENTERING BICYCLE WHEEL AND AXLE ASSEMBLY
Filed Sept. 1, 1964
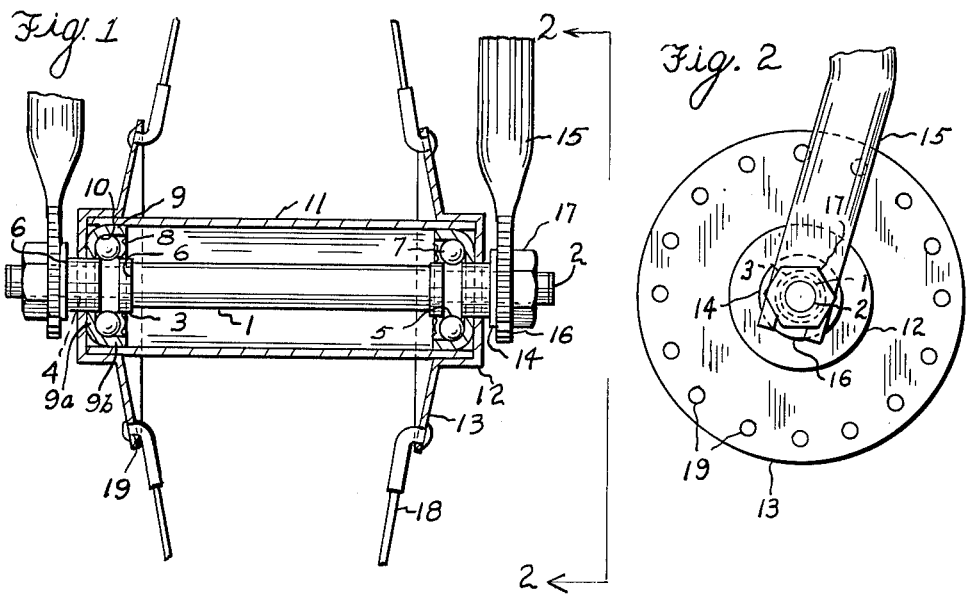
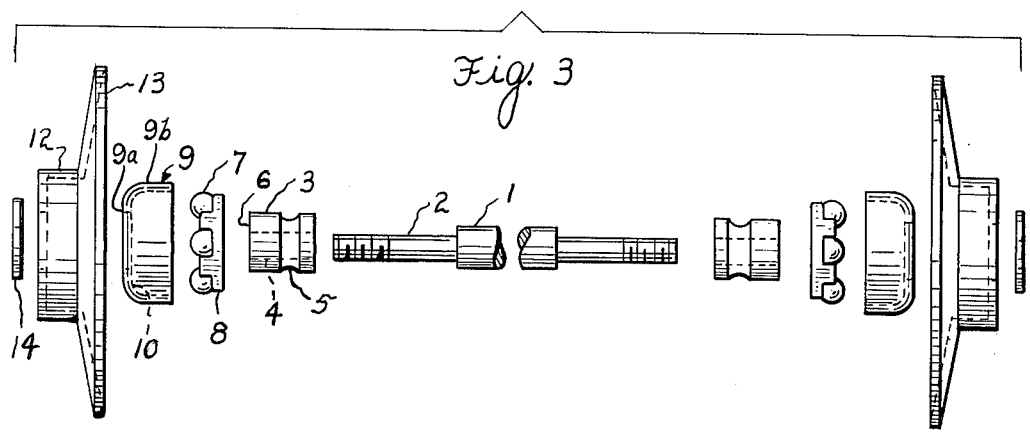
INVENTOR.
THOMAS I. DUFFY
BY Allan J. Murray
ATTORNEY

United States Patent Office 3,241,894
Patented Mar. 22, 1966

3,241,894
SELF-CENTERING BICYCLE WHEEL
AND AXLE ASSEMBLY
Thomas I. Duffy, Grand Haven, Mich., assignor of
one-half to Ethel Benedict
Filed Sept. 1, 1964, Ser. No. 393,691
2 Claims. (Cl. 308—192)

This invention relates to improvements in wheel and axle assemblies for bicycles and the like, which assemblies utilize a bifurcated fork as a wheel mounting, and particularly to wheel and axle assemblies which are self-centering between the bifurcations of such a fork, without adjustment.

It is common practice to provide the axles of bicycle wheels with tapered cones, which serve as inner raceways for antifriction elements received in the wheel hubs. The axles of such wheels have threaded end portions, and the cones are coaxially threaded thereon. In present practice, a wheel is centered upon its axle by threadedly adjusting the cones longitudinally of the axle. The wheel is then mounted between the bifurcations of a fork, the end portions of the axle shaft being received in slotted lower end portions of the bifurcations, and secured in position by nuts threaded upon the shaft end portions to engage the outer faces of the bifurcations of the fork.

The cones are conventionally provided with wrench flats, by which they must be secured against rotation while the adjacent nut is tightened to engage the bifurcation between the nut and the outer end face of the cone. Each time lubrication is required, the cones must be removed and the adjusting-centering procedure must be repeated. Further, rotation of the wheel tends to effect a gradual turning of the cones, which must then be readjusted to avoid excessive wear to bearings and raceways.

An object of this invention is to provide in a wheel-axle assembly an axle shaft formed with reduced threaded end portions, and to provide shoulders on the shaft which center the axle by thrust transmitted to the outer faces of said bifurcations.

A further object is to provide a pair of raceways on the shaft, and space said raceways equally outwardly of said shoulders, and to provide sets of ball bearings, retainers for said bearings, cups to encircle said retainers, a hub to encompass said cups, hub caps enclosing the end portions of said hub, and means to interconnect said caps to maintain the assembly.

A further object is to so predeterminedly dimension the hub and said cups with regard to the spacing between said raceways as to afford a centering of the wheel and the described axle assembly between said shoulders and consequently between the bifurcations engaged by said shoulders.

These and various other objects are attained by the construction hereinafter explained and illustrated by the accompanying drawing, wherein:

FIG. 1 is a vertical, sectional, partial view along the longitudinal axis of an axle shaft.

FIG. 2 is a vertical, partial view on line 2—2 of FIG. 1, omitting any spokes anchored to the hub-end cover flanges.

FIG. 3 is an exploded view of the elements of the axle assembly omitting wheel spokes, nuts, and bifurcations of a wheel mounting fork.

In these views the reference character 1 designates a shaft serving as an axle. Equal end portions 2 of the shaft are reduced in diameter and threaded. Annular raceway members 3 are formed with central holes 4, to receive said end portions 2. Each member 3 is formed with an arcuately contoured, annular inner raceway 5. The outer end face of each said member forms a shoulder 6, each spaced similarly outwardly from its respective raceway 5.

Ball bearings 7 carried by a retainer 8 are received in said inner raceways. Said retainer is sufficiently resiliently flexible to expand and slide over the annular member 3 between the shoulder 6 and the inner raceway 5, and snap said ball bearings into the corresponding raceway. A pair of cups 9, having annular discs 9a and annular ribs 9b are received snugly on the members 3 and enclose the sets of ball bearings 7, 8. Interiorly, each said cup is formed at the juncture of the disc 9a and rib 9b to provide an outer raceway 10 for the ball bearings. The ribs further serve to resist any resilient expansion of the retainer 8 and consequent dislodgement of the ball bearings 7 axially of the shaft.

A tubular hub 11 encloses the above-described assembly and fits closely over the cups 9. The annular ribs 9b of the latter maintain a coaxial relation between the hub 11 and shaft 1. A pair of hub caps 12 encloses the end portions of the hub and resist escape of the cups 9 from the interior of the hub.

If desired, washers 14 may be interposed between the shoulders 6 and the bifurcations 15 of the wheel-mounting fork, slotted at 16 to receive the shaft 1. Washers may further be used between said bifurcations and the nuts 17 which thread upon the end portions 2. The wheel includes the usual rim (not shown), and tensioned spokes 18 to interconnect the rim with a pair of annular flanges 13 formed on the hub caps. Holes 19 in said flanges, receive said spokes, which thus maintain the described elements in assembly.

It is conceived that the spokes 18 shall be conventional in said construction, so that they may be inserted through the hole 19, having one end portion, as shown in FIGURE 1, retained by the broad, rounded heads illustrated. The opposite ends are also conventional, being threadedly or otherwise releasably and adjustably engaged at the rim (not shown) of the wheel: said opposite end portions being adjustable to increase or decrease tension applicable longitudinally of a spoke.

Such tension both supports the rim of the wheel in concentric relation with the flanges 13, and also retains the hubcaps 12 in assembled and operable relationship with the elements of the axle. Thus, the hubcaps 12, have their flanges 13 engaged by spokes 18, and are interconnected with one another by the engagement of the spokes with the rim (not shown) of the wheel. To disassemble the wheel and axle requires disengagement of all the spokes. However, the described device, properly constructed, of proper materials, is expected to last the lifetime of the vehicle, with intermittent lubrication through a grease fitting (not shown) in the hub.

It should be noted that a grease fitting (not shown), may be inserted in the wheel hub, if desired, for admission of lubricant. However, it is intended that the hubcaps shall so closely engage the end faces of the hub 11 that a lubricant-tight seal is effected. Such seal will also, of course, keep out dirt and dust.

Once the described assembly is established in properly centered relationship to the axle, the wheel will always be centered between the bifurcations of the wheel-mounting fork, which is a considerable advantage over the adjustable cone type of construction hereinbefore. Adaptability of said assembly to employment of sheet metal stamping is a desirable cost-reducing feature.

What I claim is:

1. In combination with a bifurcated wheel mounting fork, a self-centering wheel and axle assembly, said assembly including, (a) an elongated shaft, (b) an elongated tubular hub, receiving said shaft in coaxial relationship, (c) a set of ball bearings on each end portion of said shaft and within the end portions of said hub, (c') a pair of annular retainers revolubly mounting the balls of each set, said retainers being formed of resiliently flexible material to afford expansion and contraction thereof, (d) a pair of inner raceways comprised by an annular groove located near each end portion of said shaft, each retainer resiliently expanding for sliding reception upon a respective end portion of said shaft, and resiliently contracting to seat said ball bearings in a respective inner raceway, (e) a pair of cups, each including an annular disc apertured to respectively mount upon a respective end portion of said shaft to abut a set of ball bearings, said disc being concentrically formed with, (e') an annular rib extending transversely to the plane of said disc and received within the end portion of the hub, each said rib closely encircling a respective set of ball bearings to resist undesired resilient expansion of the retainer, and dislodgement of said ball bearings from said inner raceway, (e") an outer raceway for said ball bearings being formed interiorly of each cup at the junction of said disc and rib, (f) a hubcap mounted upon each end portion of said shaft, outwardly of said cups, and enclosing a respective end portion of said tubular hub to resist escape of lubricant from said hub, and to retain a respective cup within said hub, (g) means interconnecting said hubcaps to maintain their position on said hub, (h) a shoulder located near each end portion of said shaft, and respectively equally spaced axially of the shaft from said inner raceway, (i) the bifurcations of said wheel mounting fork being appropriately apertured to receive the end portions of said shaft, and said shoulders being respectively engaged by opposing faces of said bifurcations whereby said wheel is suitably centered for rotation about said shaft, between said bifurcations.

2. In combination with a bifurcated wheel mounting fork, a self-centering wheel and axle assembly, said assembly including, (a) an elongated shaft having approximately equal and opposite end portions reduced in diameter, and formed with threads, (b) an annular bearing member received on each said end portion, and formed with an annularly recessed raceway, the outer face of each said bearing member forming a shoulder, and each raceway being respectively similarly spaced from a respective shoulder, (c) a set of ball bearings received in each said raceway, (c') a pair of annular retainers revolubly mounting the balls of each set, said retainers being formed of resiliently flexible materials to afford expansion and contraction thereof, each retainer resiliently expanding for sliding reception upon a respective annular bearing member, and resiliently contracting to seat said balls in a respective raceway, (d) a pair of cups, each including an annular disc apertured to respectively mount upon a respective bearing member to abut a set of ball bearings, each said disc being concentrically formed with, (d') an annular rib extending transversely to the plane of said disc, and received within an end portion of the hub, each said rib closely encircling a respective set of ball bearings to resist undesired resiliently expansion of the retainer, (d") an outer raceway for said ball bearings being formed interiorly of each cup at the junction of said disc and rib, (e) a tubular hub closely fitting over said ribs to enclose the shaft, said ribs establishing a coaxial relation of said hub and shaft, (f) hubcaps, apertured to be received on the bearing members, said hubcaps enclosing the respective end portions of the hub, to resist escape of lubricant, and to retain said cups within said hub, (g) said wheel including a rim, (h) said hubcaps being formed with an annular flange, (i) wheel spokes interconnecting the flange and the rim, whereby the elements of said axle assembly are maintained in assembly, (j) the bifurcations of said fork having their end portions apertured to receive the shaft end portions, and being spaced to engage said shoulders, said shoulders centering the shaft, and the wheel and axle assembly between said bifurcations, and (k) a pair of nuts threaded on said shaft and applying thrust to the outer faces of the bifurcations to flex the bifurcations toward each other.

References Cited by the Examiner

UNITED STATES PATENTS

| 1,414,270 | 4/1924 | Fry et al. | 308—192 |

FOREIGN PATENTS

| 408,182 | 1/1910 | France. |
| 528,022 | 8/1921 | France. |
| 191,371 | 8/1923 | Great Britain. |

A. HARRY LEVY, *Primary Examiner.*

ARTHUR L. LA POINT, *Examiner.*